W. L. McCASLIN.
WAGON BRAKE.
APPLICATION FILED AUG. 10, 1917.
1,294,286.
Patented Feb. 11, 1919.
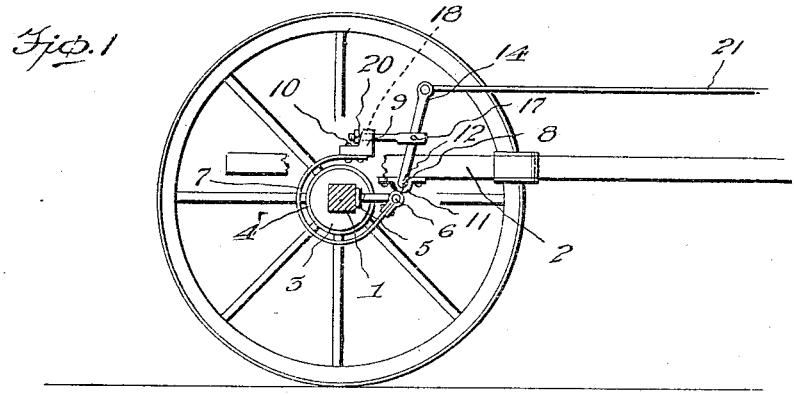
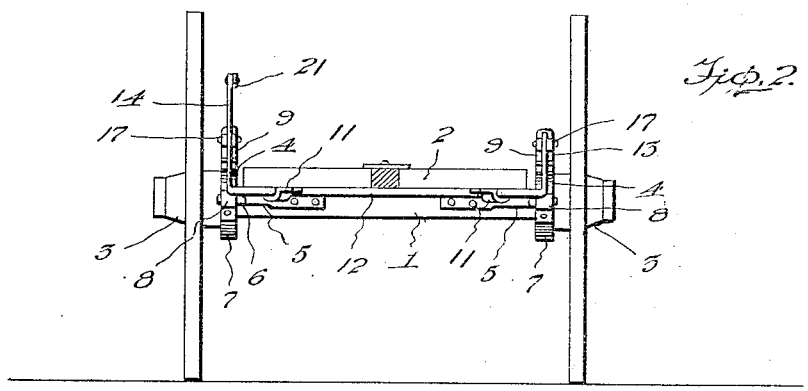
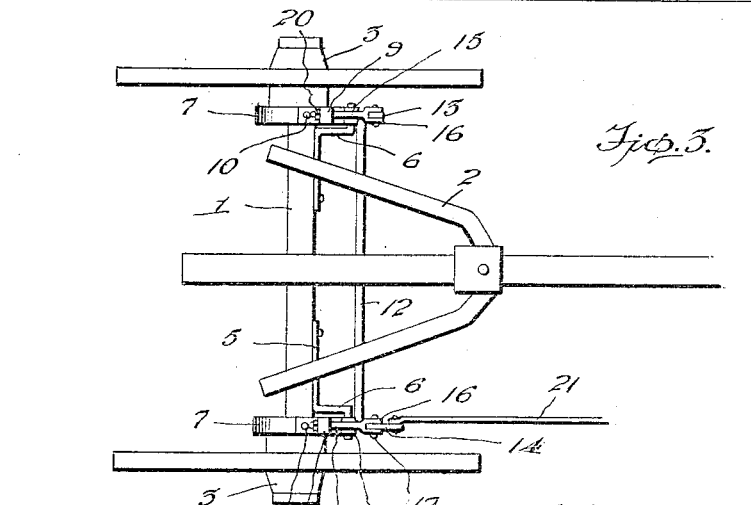
INVENTOR
W. L. McCaslin
BY Victor J. Evans
ATTORNEY
WITNESSES the other end of the brake band to the said# UNITED STATES PATENT OFFICE.

WILLIAM L. McCASLIN, OF McCUNE, KANSAS.

WAGON-BRAKE.

1,294,286.

Specification of Letters Patent.

Patented Feb. 11, 1919.

Application filed August 10, 1917. Serial No. 185,561.

*To all whom it may concern:*

Be it known that I, WILLIAM L. McCASLIN, a natural-born citizen of the United States, residing at McCune, in the county of Crawford and State of Kansas, have invented new and useful Improvements in Wagon-Brakes, of which the following is a specification.

This invention relates to improvements in wagon brakes, the object of the invention being to provide an improved brake apparatus which can be readily attached to an axle and hounds of a wagon gear and which operates in connection with the hubs of the wheels on the axles to effectually brake the vehicle when desired and which apparatus is simple in construction, is strong and durable and which can be very readily installed.

This invention consists in the construction, combination and arrangement of devices hereinafter described and claimed.

In the accompanying drawings:—

Figure 1 is an elevation of an axle, hounds and wheels of a wagon gear provided with brakes constructed and arranged in accordance with my invention.

Fig. 2 is a front elevation of the same.

Fig. 3 is a plan of the same.

For the purposes of this specification a wagon axle is indicated at 1, the hounds at 2 and the hubs of the wheels on said axle are indicated at 3. Each of the wheel hubs is provided at its inner end with a friction ring 4.

I also provide bracket bars 5 which are secured on one side of the axle and each of which is provided with an angle arm 6 at its outer end. Spring brake bands 7, which are in the form of open rings, are arranged around the friction rings, each brake band having an eye 8 at one end which engages the angle arm of one of the bracket bars and is thereby connected at said end to said bracket bar. At the upper, free end each spring brake band is provided with a block 9 which is attached thereto as at 10.

Bearings 11 are secured to the hounds and a rock shaft 12 is mounted in said bearings and arranged parallel with and at a suitable distance from the axle. The rock shaft has lever arms 13, 14 of unequal length at its ends. Adjusting and connecting bolts 15 are each provided at the front end with a fork 16 the said forks receiving the lever arms of the rock shaft and being pivotally connected thereto as at 17. The bolts pass through and are slidable longitudinally in openings 18 with which the blocks 9 are provided and adjusting nuts 20 are threaded on the bolts and engage the rear ends of the blocks. The longer lever arm of the rock shaft is connected by a rod 21 to the usual brake lever, which is not here shown.

The brake bands, being springs are normally open and out of engagement with the friction rings of the wheel hubs. When the rock shaft is turned by means of the brake lever, the spring brake bands are closed around and caused to frictionally grip the friction rings and hence serve to effectually brake the wheels, as will be understood. The bolts which connect the lever arms of the rock shaft to the free ends of the spring brake bands enable the latter to be adjusted so that the frictional grip of the brake bands on the hub rings may be regulated as desired. The blocks which serve to connect the bolts to the free ends of the spring brake bands are securely connected to the brake bands and extend rearwardly thereon so that a compact arrangement is effected between the bands, the bracket bars and the rock shaft and the brake apparatus requires but little space for its installation.

While I have herein shown and described a preferred form of my invention, I would have it understood that changes may be made in the form, proportion and construction of the several parts, without departing from the spirit of my invention and within the scope of the appended claim.

Having thus described my invention, I claim:—

In brake apparatus for application to an axle and hounds of a wagon and comprising a bracket bar having an angle arm at its outer end, means to secure said bracket bar to the front side of the axle and arrange the angle arm in front of a wheel hub, bearings, means to secure the bearings to the hound, a rock shaft mounted in the bearings and having a rock arm, a spring brake band for arrangement around the wheel hub, means to secure one end of said brake band to the projecting angle arm of the bracket bar and means to detachably and adjustably connect the other end of the brake band to the said rock arm.

In testimony whereof I affix my signature.

WILLIAM L. McCASLIN.

Copies of this patent may be obtained for five cents each, by addressing the "Commissioner of Patents, Washington, D. C."